No. 735,819. Patented August 11, 1903.

UNITED STATES PATENT OFFICE.

ALONZO RAMSDELL, OF CHICAGO, ILLINOIS.

ALLOY AND PROCESS OF MAKING SAME.

SPECIFICATION forming part of Letters Patent No. 735,819, dated August 11, 1903.

Application filed April 15, 1903. Serial No. 152,699. (No specimens.)

*To all whom it may concern:*

Be it known that I, ALONZO RAMSDELL, a citizen of the United States, residing at Chicago, in the county of Cook and State of Illinois, have invented a certain new and Improved Composition of Matter and Process of Manufacturing the Same, of which the following is a specification.

My invention relates to metallic compositions and to the manufacture of the same, and has for its object to produce certain improvements upon the invention set forth in Letters Patent No. 716,276, granted to me on the 16th day of December, 1902. In said Letters Patent I described a composition made from cast-iron by treating it under suitable conditions with a small proportion of lead and described the specific method of procedure which I had found to produce the best results, such method of procedure consisting, as therein stated, in taking cast-iron and melting it in any suitable apparatus and afterward allowing it to cool until it became somewhat reddish in tint, but still in a molten condition, and to each one hundred pounds of the molten cast-iron I then added a small amount of lead, stirred the mixture, and afterward allowed the mass to cool. This same method of procedure is followed in producing my improved matter; but to the molten cast-iron I add, in addition to the lead, (which may vary from nine to fifteen ounces to each one hundred pounds of cast-iron,) from two to eight ounces of antimony and from four to ten ounces of aluminium to each one hundred pounds of molten cast-iron. The molten cast-iron after having added to it the lead, antimony, and aluminium in substantially the proportions specified is to be stirred and the mass afterward allowed to cool.

I have found that the addition of the aluminium has the effect of slightly softening and strengthening the composition, and the addition of the antimony is a valuable addition for preventing rusting. Under ordinary conditions of use the composition described in my said former Letters Patent will not rust; but where materials made of such composition are used in sea-water and in places where they may be subjected to galvanic currents a slight tendency to rust has been exhibited; but with the addition of the antimony, as herein specified, such tendency to rust is believed to be absolutely avoided.

It should be understood that my invention includes the use of equivalent substances instead of those named.

What I claim as new, and desire to secure by Letters Patent, is—

1. The composition of matter, which consists of cast-iron, lead, antimony and aluminium in proportions substantially of one hundred pounds of cast-iron to from nine to fifteen ounces of lead, two to eight ounces of antimony, and four to ten ounces of aluminium, the ingredients to be mixed and stirred while in a molten condition, substantially as described.

2. The composition of matter formed by melting cast-iron, and adding lead, antimony and aluminium thereto, while the iron is in a molten condition, in the proportions of substantially nine to fifteen ounces of lead, two to eight ounces of antimony, and four to ten ounces of aluminium, to each one hundred pounds of iron, substantially as described.

3. The method of treating cast-iron, which consists in melting the same, and adding lead, antimony and aluminium thereto, while the iron is still in a molten condition, in the proportions of from nine to fifteen ounces of lead, two to eight ounces of antimony, and four to ten ounces of aluminium, to each one hundred pounds of the cast-iron, substantially as described.

4. The method of treating cast-iron, which consists in melting the same, and adding lead, antimony and aluminium thereto, while the iron is still in a molten condition, in the proportions of from nine to fifteen ounces of lead, two to eight ounces of antimony, and four to ten ounces of aluminium, to each one hundred pounds of the cast-iron, and then stirring the mixture, substantially as described.

5. The method of treating cast-iron, which consists in melting the same, and allowing it to cool until it assumes a reddish color, then adding thereto, while still in a molten condition, from nine to fifteen ounces of lead, two to eight ounces of antimony, and four to ten ounces of aluminium, to each one hundred pounds of the iron, and then mixing the ingredients, substantially as described.

6. The method of treating cast-iron, which consists in melting the same, and adding lead and antimony thereto, while the iron is still in a molten condition, in the proportions of nine to fifteen ounces of lead, and two to eight ounces of antimony, to each one hundred pounds of cast-iron, substantially as described.

ALONZO RAMSDELL.

Witnesses:
ALBERT H. ADAMS,
HELEN M. COLLIN.